(12) United States Patent
Yoshida et al.

(10) Patent No.: US 7,318,269 B2
(45) Date of Patent: Jan. 15, 2008

(54) METHOD OF MANUFACTURING COIL COMPONENT

(75) Inventors: Makoto Yoshida, Tokyo (JP); Nobuyuki Okuzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 441 days.

(21) Appl. No.: 10/917,406

(22) Filed: Aug. 13, 2004

(65) Prior Publication Data

US 2005/0050717 A1    Mar. 10, 2005

(30) Foreign Application Priority Data

Sep. 4, 2003    (JP)    ............... 2003-312776

(51) Int. Cl.
*H01F 7/06*    (2006.01)
(52) U.S. Cl. .................. 29/602.1; 29/604; 29/605; 336/200
(58) Field of Classification Search ............... 29/602.1, 29/605–608, 825, 830–831; 336/65, 83, 336/200, 206–208, 232, 234; 156/256, 277; 451/36, 41, 286
See application file for complete search history.

(56) References Cited

U.S. PATENT DOCUMENTS

| | | | | |
|---|---|---|---|---|
| 4,735,679 A | * | 4/1988 | Lasky | ................. 438/759 |
| 5,445,996 A | * | 8/1995 | Kodera et al. | ............ 438/633 |
| 5,850,682 A | * | 12/1998 | Ushiro | ................. 29/608 |
| 5,914,275 A | * | 6/1999 | Kodera et al. | ............ 438/693 |
| 6,710,694 B2 | * | 3/2004 | Matsuta et al. | ............ 336/200 |
| 7,121,926 B2 | * | 10/2006 | Sabde | ................. 451/41 |
| 7,140,092 B2 | * | 11/2006 | Park et al. | ............... 29/602.1 |
| 7,145,427 B2 | * | 12/2006 | Yoshida et al. | ............ 336/200 |

FOREIGN PATENT DOCUMENTS

| | | |
|---|---|---|
| JP | A 11-54326 | 2/1999 |
| JP | A 2003-133135 | 5/2003 |

* cited by examiner

*Primary Examiner*—Minh Trinh
(74) *Attorney, Agent, or Firm*—Oliff & Berridge, PLC

(57) ABSTRACT

The invention relates to a method of manufacturing a coil component uses as a major part of a common mode choke coil or a transformer, and there is provided a method of manufacturing a compact and low height coil component in which deterioration of impedance characteristics is low and reliability is high. An insulating film is formed on a magnetic substrate, and open regions are formed in the insulating film. A lead terminal portion is formed on the insulating film, and a planarizing film is formed on the open regions. An insulating film is formed and openings are formed in the insulating film at the open regions. A coil conductor is formed on the insulating film, and a planarizing film is further formed on the planarizing film. After a coil conductor is further formed on the coil conductor through the insulating film, the planarizing films are removed.

3 Claims, 10 Drawing Sheets

METHOD OF MANUFACTURING COIL COMPONENT

BACKGROUND OF THE INVENTION

1. Field of the Invention

The present invention relates to a coil component uses as a major component or the like of a common mode choke coil or transformer and a method of manufacturing the same.

2. Description of the Related Art

Reductions in the size of electronic equipments such as personal computers and portable phones have resulted in demand for reductions in the size and thickness (low height) of electronic components such as coils and capacitors that are mounted on circuits in electronic equipments.

However, a wound-wire coil provided by winding a copper wire or the like around a ferrite core has a problem in that it is difficult to make compact because of structural limitations. Under the circumstance, research and development is active on chip type coil components, which can be provided with a small size and a low height. Known chip type coil components include multi-layer type coil components provided by forming a coil conduct or pattern on a surface of a magnetic sheet such as ferrite and stacking such magnetic sheets and thin film type coil components provided by alternately forming insulating films and coil conductors in the form of metal thin films using thin film formation techniques.

As a thin film type coil component, a common mode choke coil is known. The common mode choke coil has such a structure that two coil conductors in the form of spirals provided opposite to each other through an insulating film are embedded in an insulating layer formed between two ferrite substrates (magnetic substrates) disposed to be opposite to each other. Open regions are formed at an inner peripheral side and an outer peripheral side of the spiral coil conductor. A magnetic layer made of a magnetic material obtained by mixing magnetic powder in an insulating material is formed in the open region. When power is applied to the coil conductors, a closed magnetic path is formed on a section including the center axis of the coil conductor.

A conventional method of manufacturing a common mode choke coil will be described with reference to FIGS. 8A to 10B. FIGS. 8A to 10B are manufacturing process sectional views of a common mode choke coil. First, as shown in FIG. 8A, an insulating film 59a is formed on a magnetic substrate 53, and open regions 65 and 67 are opened by patterning the insulating film 59a. Next, as shown in FIG. 8B, a lead terminal portion 71 is formed in the vicinity of, for example, the open region 65 on the insulating film 59a. Next, as shown in FIG. 8C, an insulating film 59b is formed on the entire surface, and a contact hole 75 in which the lead terminal portion 71 is exposed and openings at the open regions 65 and 67 are formed by patterning the insulating film 59b.

Next, as shown in FIG. 8D, a coil conductor 61 patterned into a spiral shape is formed on the insulating film 59b by using a frame plating method. One end of the coil conductor 61 is formed on the lead terminal portion 71 exposed in the contact hole 75. As a result, the coil conductor 61 and the lead terminal portion 71 are electrically connected to each other.

Next, as shown in FIG. 9A, an insulating film 59c is formed on the entire surface, and openings at the open regions 65 and 67 are formed by pattering the insulating film 59c. Next, as shown in FIG. 9B, a coil conductor 63 patterned into a spiral shape is formed on the insulating film 59c by using the frame plating method.

Next, as shown in FIG. 9C, an insulating film 59d is formed on the entire surface, and a contact hole 77 in which one end of the coil conductor 63 is exposed and openings at the open regions 65 and 67 are formed by patterning the insulating film 59d.

Next, a lead terminal portion 73 is formed on the insulating film 59d. As shown in FIG. 9D, one end of the lead terminal portion 73 is formed on the one end of the coil conductor 63 exposed in the contact hole 77. As a result, the coil conductor 63 and the lead terminal portion 73 are electrically connected to each other.

Next, as shown in FIG. 10A, an insulating film 59e is formed on the entire surface, and the open regions 65 and 67 are opened by patterning insulating film 59e. Next, as shown in FIG. 10B, composite ferrite obtained by mixing magnetic powder of ferrite in insulating resin is embedded in the open regions 65 and 67 to form magnetic layers 68. Next, an adhesive is applied on the magnetic layers 68 in the open regions 65 and 67 and the insulating film 59e to form an adhesive layer 69. Next, a magnetic substrate 55 is attached to the adhesive layer 69, and the common mode choke coil is completed.

In order to improve impedance characteristics by increasing magnetic coupling between the coil conductors 61 and 63 and by increasing common impedance, the film thickness of the insulating film 59c between the coil conductors 61 and 63 is required to be made uniform and flat. Further, the film thicknesses of the coil conductors 61 and 63 are made uniform, and the sectional shapes of the coil conductors 61 and 63 orthogonal to the direction of the flow of current are required to be made almost identical independently of place.

However, each of the insulating films 59a to 59e is formed by applying, for example, polyimide resin on the entire surface and is patterned to provide the openings at the open regions 65 and 67. The polyimide resin applied in the open regions 65 and 67 is removed each time the respective insulating films 59a to 59e are formed, and the magnetic substrate 53 is always exposed in the open regions 65 and 67. Thus, a large step occurs between the upper surface of the insulating film and the surface of the magnetic substrate 53 exposed in the open regions 65 and 67. By the influence of the step, as shown in FIG. 9B, the film thickness of the insulating film 59c is decreased in the vicinity of the open regions 65 and 67, and the film thickness of the insulating film 59c in the vicinity of the open regions 65 and 67 is different from that in the other area, and as a result, there arises a problem that the interval between the coil conductors 61 and 63 becomes uneven.

Further, since the coil conductor 63 is formed on the insulating film 59c having the uneven film thickness, as shown in FIG. 9B, the sectional shape of the coil conductor 63 also becomes uneven between the vicinity of the open regions 65 and 67 and the other area. Also in the patterning of the resist frame for the formation of the coil conductor 63, the height of the resist frame becomes uneven between the vicinity of the open regions 65 and 67 and the other area, and there is a possibility that the plating film overflows onto the upper surface of the resist frame formed to have the low height, and the sectional shape of the coil conductor 63 becomes uneven. Further, there is also a problem that the resistance value of the coil conductor 63 locally varies due to the unevenness of the sectional shape of the coil conductor 63.

As stated above, when the film thickness of the insulating film 59c becomes uneven, the magnetic coupling between the coil conductors 61 and 63 becomes small, the common impedance is lowered, and the impedance characteristic is deteriorated. Further, the manufacture of the common mode choke coil having high impedance becomes difficult by the unevenness of the film thickness of the insulating film $59c$ and the unevenness of the sectional shape of the coil conductor 63.

SUMMARY OF THE INVENTION

An object of the invention is to provide a method of manufacturing a coil component which can manufacture a compact and low height coil component superior in impedance characteristics.

The above object is achieved by a method of manufacturing a coil component characterized in that it has the steps of forming an insulating film on a magnetic substrate, forming a predetermined open region in the insulating film, forming a planarizing film in the open region, forming a coil conductor made of a conductive material on the insulating film, forming an insulating film on the coil conductor, and removing the planarizing film.

A method of manufacturing a coil component according to the invention is characterized in that the planarizing film is formed by using the conductive material and at the same time as formation of the coil conductor.

A method of manufacturing a coil component according to the invention is characterized in that the planarizing film is formed before formation of the coil conductor.

A method of manufacturing a coil component according to the invention is characterized in that a planarizing film is further formed on the planarizing film by using the conductive material and at the same time as formation of the coil conductor.

Besides, the above object is achieved by a method of manufacturing a coil component characterized in that it has the steps of forming a first insulating film on a first magnetic substrate, forming a predetermined open region in the first insulating film, forming a first metal layer on a entire surface, forming a first lead terminal portion on the first insulating film and a first planarizing film on the open region by patterning the first metal layer, forming a second insulating film on a entire surface, forming an opening in the second insulating film at the open region, forming a second metal layer on a entire surface, forming a first coil conductor in a spiral shape on the second insulating film so that the open region is positioned at an inner peripheral side and a second planarizing film on the first planarizing film by patterning the second metal layer, forming a third insulating film on a entire surface, forming an opening in the third insulating film at the open region, forming a third metal layer on a entire surface, forming a second coil conductor in a spiral shape on the third insulating film so that the open region is positioned at an inner peripheral side by patterning the third metal layer, forming a fourth insulating film on a entire surface, forming an opening in the fourth insulating film at the open region, forming a fourth metal layer on a entire surface, forming a second lead terminal portion on the fourth insulating film by patterning the fourth metal layer, forming a fifth insulating film on a entire surface, forming an opening in the fifth insulating film at the open region, removing the first and the second planarizing films, forming a magnetic layer embedded in at least the open region, and attaching a second magnetic substrate onto the magnetic layer.

A method of manufacturing a coil component according to the invention is characterized in that a same metal material is used for the first to the fourth metal layers.

A method of manufacturing a coil component according to the invention is characterized in that the metal material is copper.

A method of manufacturing a coil component according to the invention is characterized in that the coil conductor is formed using a frame plating method.

According to the invention, a compact and low height coil component excellent in impedance characteristics can be manufactured.

BRIEF DESCRIPTION OF THE DRAWINGS

FIGS. 2A and 2B are views showing coil conductors 11 and 13 of the common mode choke coil 1 of the embodiment of the invention, in which FIG. 2A shows a plane shape including the coil conductor 11, and FIG. 2B shows a plane shape including the coil conductor 13;

DETAILED DESCRIPTION OF THE INVENTION

Figure 1:
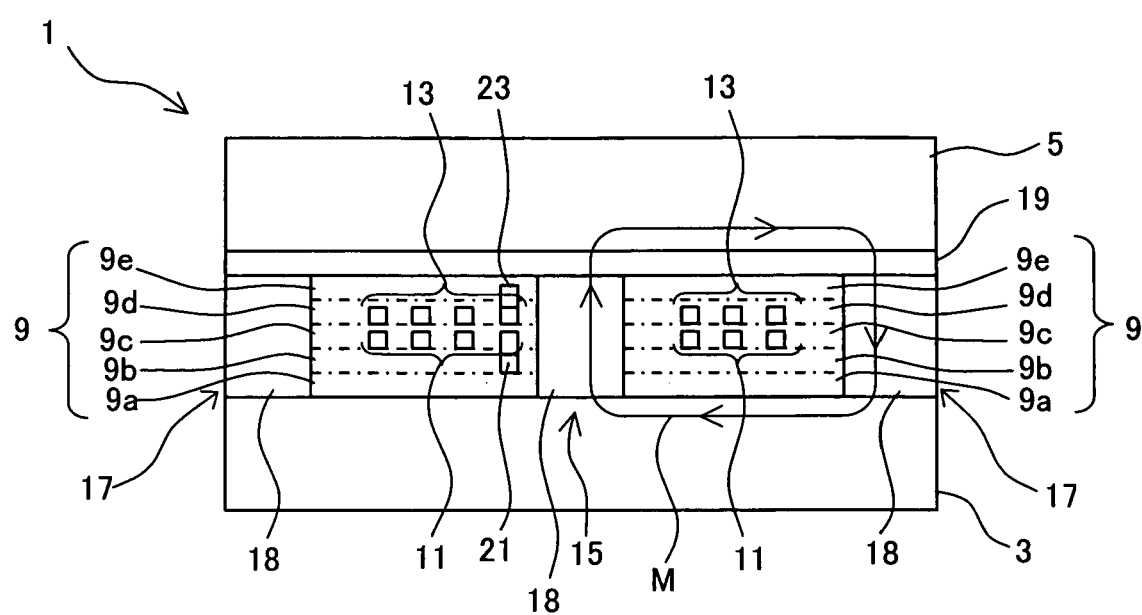
FIG. 1 is a view showing a section of a common mode choke coil 1 of an embodiment of the invention taken along the imaginary line A-A of FIGS. 2A and 2B.
Figure 2A:
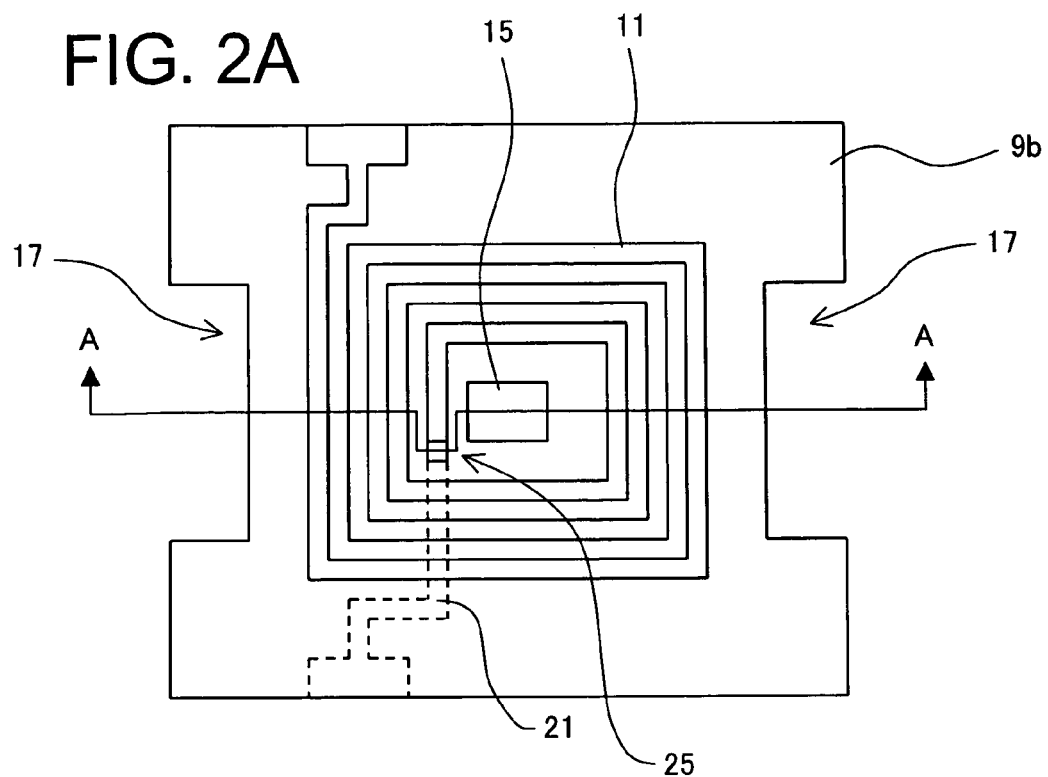
Figure 2B:
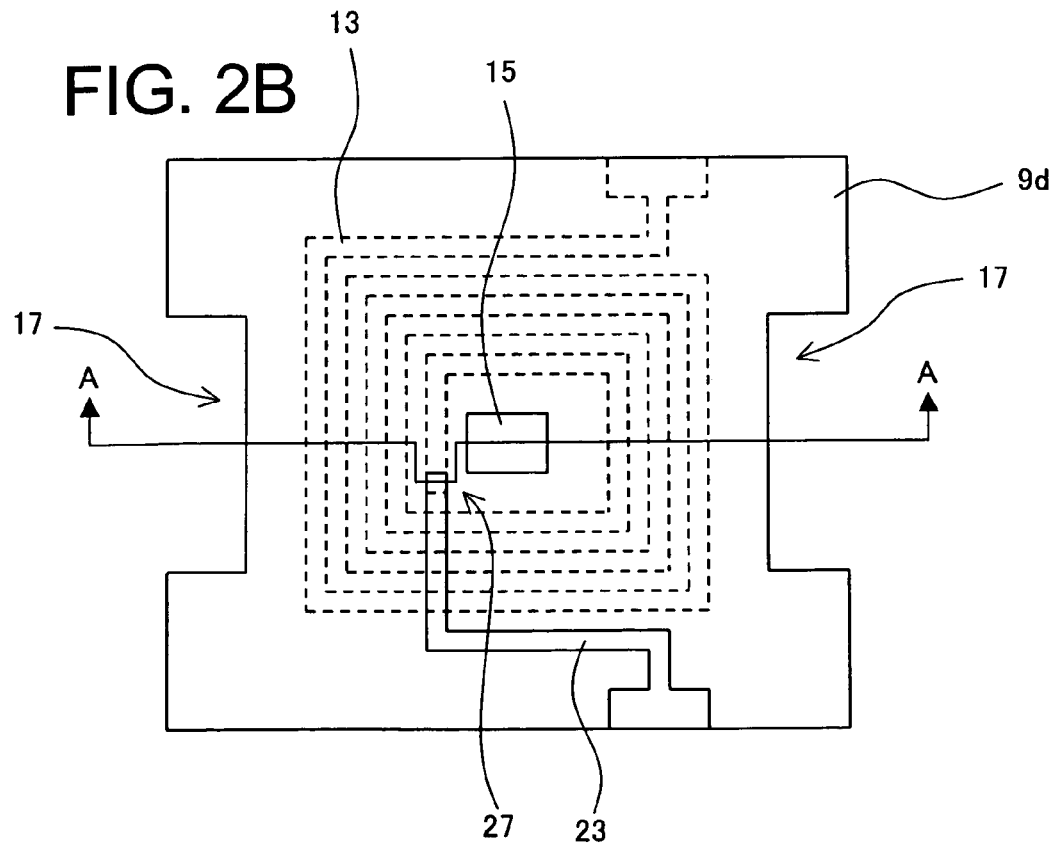

A coil component and a method of manufacturing the same according to an embodiment of the invention will be described with reference to FIGS. 1 to 7B. In this embodiment, a description will be made while a common mode choke coil for suppressing common mode current causing electromagnetic interference in a balanced transmission system is used as an example of the coil component. First, a structure of a common mode choke coil 1 will be described with reference to FIGS. 1 to 2B. FIG. 1 shows a section of the common mode choke coil 1 taken along an imaginary line A-A of FIGS. 2A and 2B. FIG. 2A shows a plane shape of the common mode choke coil 1 including a coil conductor 11. FIG. 2B shows a plane shape including a coil conductor 13.

As shown in FIG. 1, the common mode choke coil 1 of this embodiment has such a structure that an insulating film 9a, a lead terminal portion 21, an insulating film 9b, a coil conductor 11 made of conductive material, an insulating film 9c, a coil conductor 13 made of conductive material, an insulating film 9d, a lead terminal portion 23 and an insulating film 9e are laminated in this order on a magnetic substrate 3 formed of ferrite. The coil conductor 11 and the coil conductor 13 face each other through the insulating film 9c. The coil conductors 11 and 13 are embedded in an insulating layer 9 constituted by the insulating films 9a to 9e. Each of the insulating films 9a, 9b, 9c, 9d and 9e of the insulating layer 9 is made of polyimide resin, and is formed by an after-mentioned manufacturing method to have an almost uniform and flat film thickness. At the inner peripheral side of the coil conductors 11 and 13, the insulating layer 9 is removed and an open region 15 is formed. At the outer peripheral side of the coil conductors 11 and 13, the insulating layer 9 is removed and an open region 17 is formed.

Magnetic layers 18 embedded in the open regions 15 and 17 are formed. The magnetic layers 18 are formed of composite ferrite obtained by mixing magnetic powder of ferrite in polyimide resin. Further, an adhesive layer 19 is formed on the magnetic layers 18 and the insulating film 9e, and a magnetic substrate 5 formed of ferrite is adhered.

As shown in FIG. 2A, the coil conductor 11 is formed into a spiral shape on the insulating film 9b. The coil conductor 11 is connected to one terminal of the lead terminal portion 21 formed in a lower layer of the insulating film 9b and indicated by a broken line in the drawing through a contact hole 25 formed in the insulating film 9b. The other terminal of the lead terminal portion 21 is connected to an electrode terminal (not shown) formed at a side surface of the common mode choke coil 1.

As shown in FIG. 2B, the lead terminal,portion 23 is formed on the insulating film 9d. The spiral coil conductor 13 having almost the same shape as the coil conductor 11 and indicated by a broken line in the drawing is formed in a lower layer of the insulating film 9d. The coil conductor 13 is connected to one terminal of the lead terminal portion 23 through a contact hole 27 formed in the insulating film 9d. The other terminal of the lead terminal portion 23 is connected to another electrode terminal (not shown) formed at the side surface of the common mode choke coil 1.

Next, the operation of the common mode choke coil 1 according to this embodiment will be described. When power is applied to the coil conductors 11 and 13, as shown in FIG. 1, a magnetic path M passing through the magnetic substrate 3, the magnetic layer 18 of the open region 15, the adhesive layer 19, the magnetic substrate 5, the adhesive layer 19 and the magnetic layer 18 of the open region 17 in this order (or in reverse order) is formed in a section including the center axis of the coil conductors 11 and 13. Although the adhesive layer 13 is nonmagnetic, it is a thin film of several μm thickness. Thus, a leak of magnetic lines of force is hardly generated in this portion, and the magnetic path M can be regarded as being an almost closed magnetic path. Accordingly, the common mode choke coil 1 has an excellent degree of magnetic coupling and an impedance characteristic.

Next, a method of manufacturing the common mode choke coil 1 according to this embodiment will be described with reference to FIGS. 3A to 7B. FIGS. 3A, 3B, 3C, 3D, 6A, 6B, 6C, 6D, 7A and 7B show the section of the common mode choke coil 1 taken along an imaginary line A-A of FIGS. 2A and 2B. Incidentally, structural elements having the same operation and function as the structural elements of the common mode choke coil 1 shown in FIGS. 1, 2A and 2B are denoted by the same symbols and their description will be omitted.

Figure 3A:
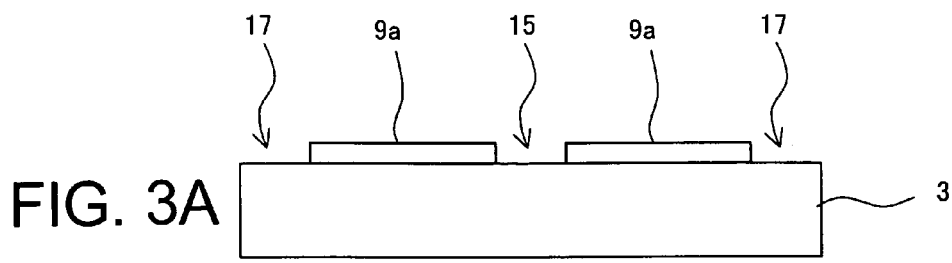
FIGS. 3A to 3D are sectional views showing a manufacturing process of the common mode choke coil 1 of the embodiment of the invention.
Figure 3B:
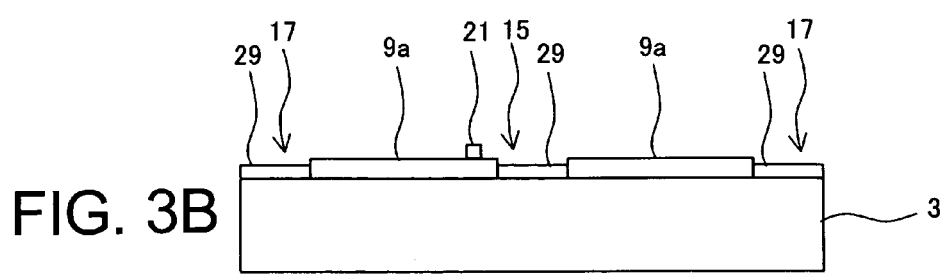

First, as shown in FIG. 3A, polyimide resin is applied on a magnetic substrate (first magnetic substrate) 3 made of ferrite to form an insulating film (first insulating film) 9a having a thickness of 7 to 8 μm, and open regions 15 and 17 are formed by patterning the insulating film 9a. Next, as shown in FIG. 3B, a first metal layer (not shown) of Cu (copper) or the like is formed on the entire surface. A lead terminal portion (first lead terminal portion) 21 (see FIG. 2A)having a thickness of 5 μm, one terminal of which is positioned in the vicinity of the open region 15 and the other terminal of which is positioned at the periphery of the magnetic substrate 3 is formed by patterning the first metal layer. At the same time, a planarizing film (first planarizing film) 29 having a thickness of 5 μm is formed by patterning the first metal layer in the open regions 15 and 17. Since a step between the insulating film 9a and the open regions 15 and 17 is decreased by the planarizing film 29, the thickness of an insulating film 9b formed at a subsequent process can be made very uniform and flat.

Figure 3C:
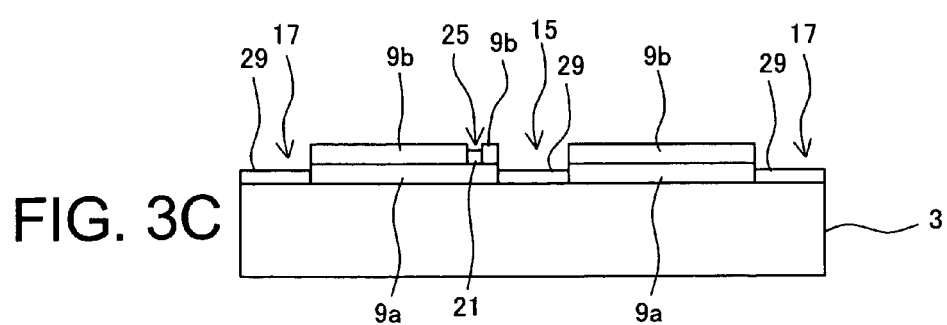

Next, as shown in FIG. 3C, polyimide resin is applied on the entire surface to form an insulating film (second insulating film) 9b having a thickness of 7 to 8 μm, and a contact hole 25 in which one terminal of the lead terminal portion 21 is exposed and openings in which the planarizing film 29 is exposed at the open regions 15 and 17 are formed by patterning the insulating film 9b.

Figure 3D:
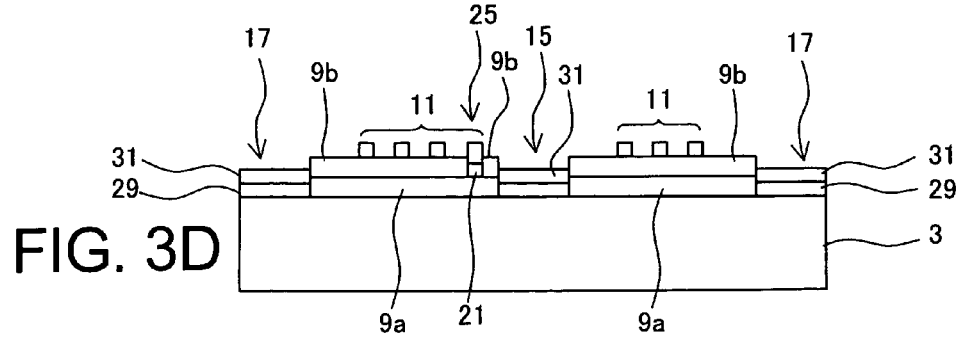

Next, as shown in FIG. 3D, a second metal layer (not shown) of a Cu layer or the like is formed on the entire surface, and a coil conductor (first coil conductor) 11 having a spiral shape and a thickness of 5 μm on the insulating film 9b, and a planarizing film (second planarizing film) 31 on the planarizing film 29 formed in the open regions 15 and 17 are formed by patterning the second metal layer. One terminal of the coil conductor 11 is formed on the one terminal of the lead terminal portion 21 exposed in the contact hole 25. As a result, the coil conductor 11 and the lead terminal portion 21 are electrically connected to each other. On the other hand, the other terminal is formed at the periphery of the magnetic substrate 3 opposite to the other terminal of the lead terminal portion 21 through the insulating film 9b (see FIG. 2A).

Figure 4A:
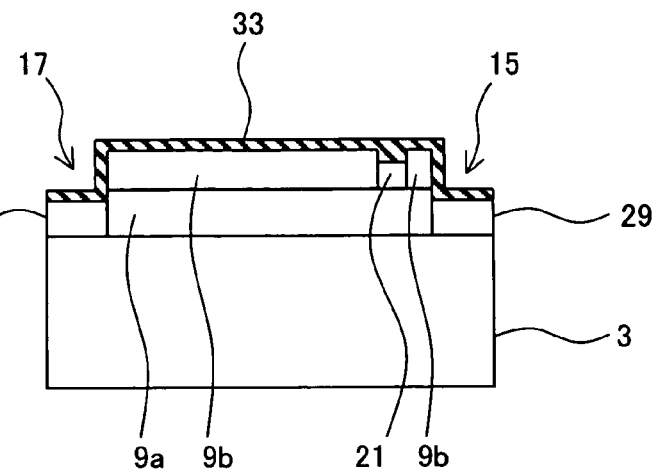
FIGS. 4A to 4C are sectional views showing a manufacturing process of the coil conductor 11 and a planarizing film 31 of the common mode choke coil 1 of the embodiment of the invention.

The coil conductor 11 and the planarizing film 31 are formed by using a frame plating method. The frame plating method will be described with reference to FIGS. 4A to 5C. The frame plating method is a method of forming a plating film using a mold (frame) formed by patterning a resist layer. FIGS. 4A to 5C show a manufacturing process of the coil conductor 11 and the planarizing film 31, and show a portion between the center part of the left open region 17 of FIG. 3D and the center part of the open region 15. The insulating film 9a, the lead terminal portion 21 and the insulating film 9b are formed in this order on the magnetic substrate 3 through the manufacturing process of FIGS. 3A to 3D. Further, the planarizing film 29 is formed on the open regions 15 and 17. As shown in FIG. 4A, an electrode film 33 is formed on the entire surface by using a sputtering method or an evaporation method. An adhesive layer in the form of, for example, a Cr (chromium) film or a Ti (titanium) film may be formed under the electrode film 33 in order to improve the adhesiveness to the insulating film 9b and the planarizing film 29. Although the electrode film 33 may be formed of any material as long as the material has conductivity, if possible, it is desirable to use the same material as the metal material to be plated.

Figure 4B:
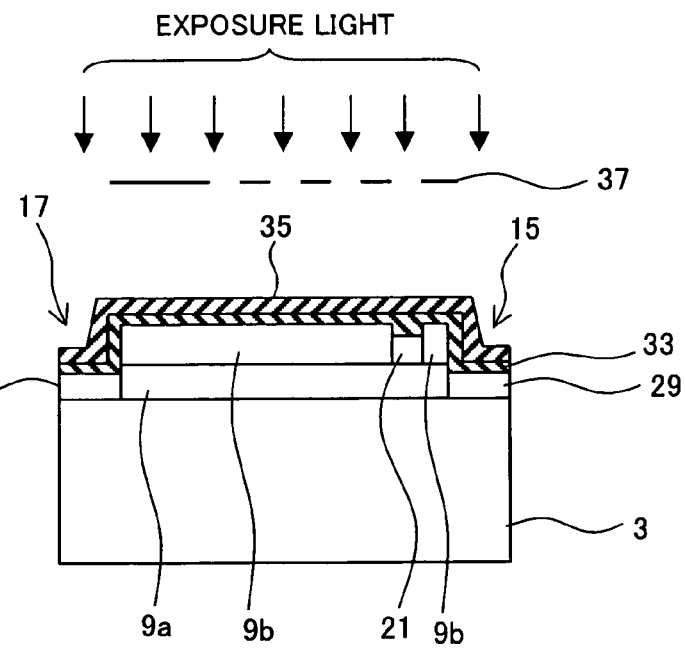

Next, as shown in FIG. 4B, a resist layer 35 is formed by applying a resist on the entire surface, and as the need arises, a pre-baking process is performed on the resist layer 35. Next, exposure light is irradiated through a mask 37 on which a pattern of the coil conductor 11 and the planarizing film 31 is drawn, and the resist layer 35 is exposed to the light.

Figure 4C:
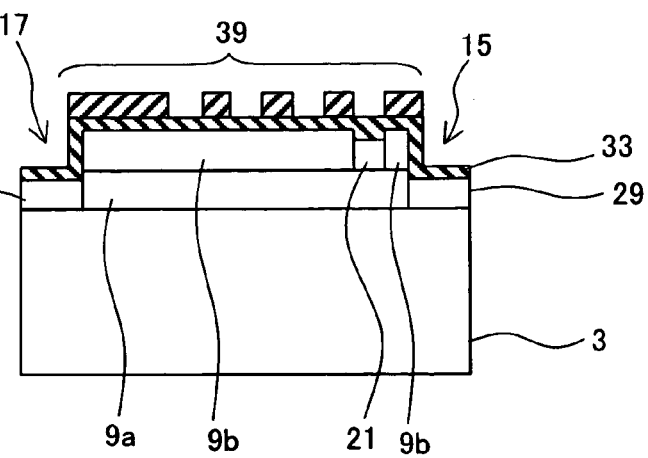

Next, after a heat treatment is performed as the need arises, development is performed using an alkaline developing solution. As the alkaline developing solution, for example, a tetramethyl ammonium hydroxide (TMAH) in a predetermined concentration is used. Next, the developing step is then followed by a cleaning step. The developing solution in the resist layer 35 is cleaned with a cleaning liquid, the developing and dissolving reaction of the resist layer 35 is stopped, and as shown in FIG. 4C, a resist frame 39 patterned into a predetermined shape is formed. As the cleaning liquid, for example, pure water is used.

Figure 5A:
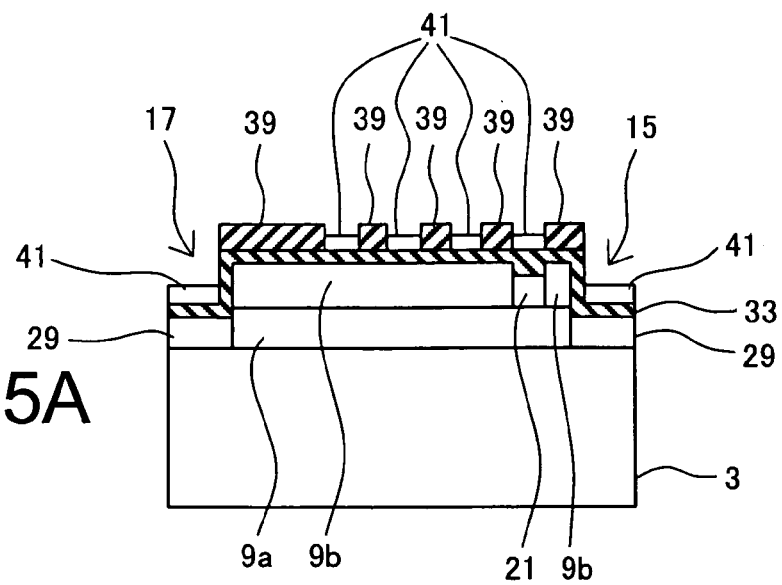
FIGS. 5A to 5C are sectional views showing the manufacturing process of the coil conductor 11 and the planarizing film 31 of the common mode choke coil 1 of the embodiment of the invention.
Figure 5B:
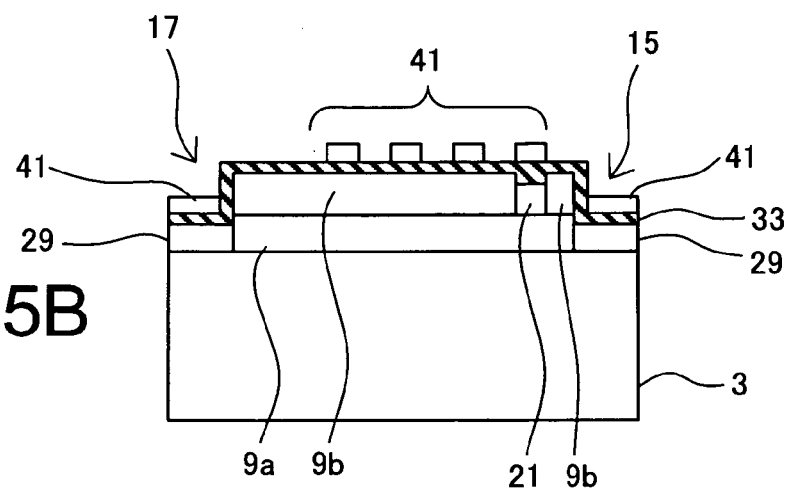
Figure 5C:
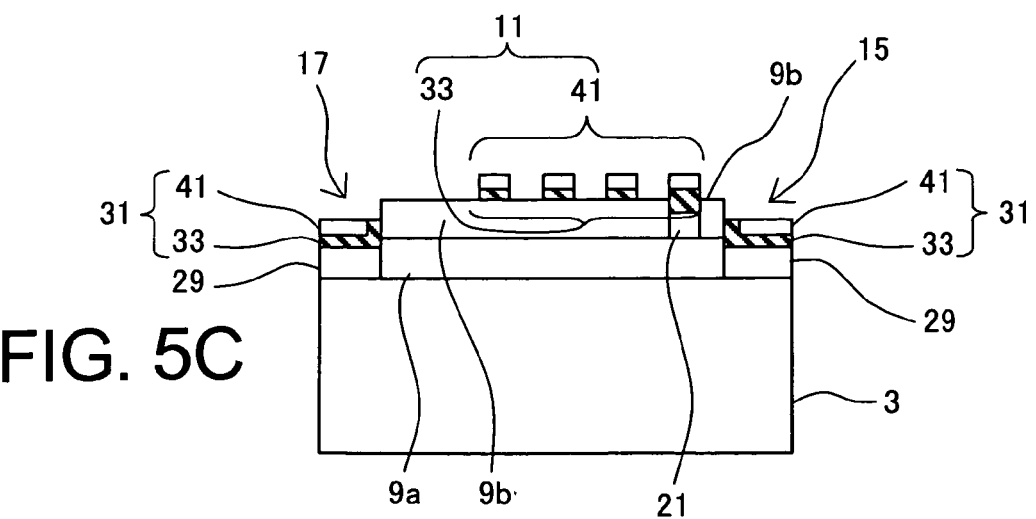

When the cleaning is completed, the cleaning liquid is scattered away to dry the magnetic substrate3. If necessary, the magnetic substrate 3 is heated to dry up the cleaning liquid. Next, as shown in FIG. 5A, the magnetic substrate 3 is dipped in a plating solution in a plating bath, a plating process is performed using the resist frame 39 as the mold, and a plating film 41 is formed in gaps in the resist frame 39. Next, as shown in FIG. 5B, after rinsing and drying is performed as the need arises, the resist frame 39 is peeled off from the insulating film 9b by using an organic solvent. Next, as shown in FIG. 5C, the electrode film 33 is removed by dry etching (ion milling, reactive ion etching (RIE), etc.) or wet etching using the plating film 41 as a mask. In this way, the coil conductor 11 and the planarizing film 31 are formed. Since a step between the insulating film 9b and the open regions 15 and 17 is decreased by the planarizing films 29 and 31, the film thickness of the insulating film 9c formed at a subsequent process can be made very uniform and flat.

Figure 6A:
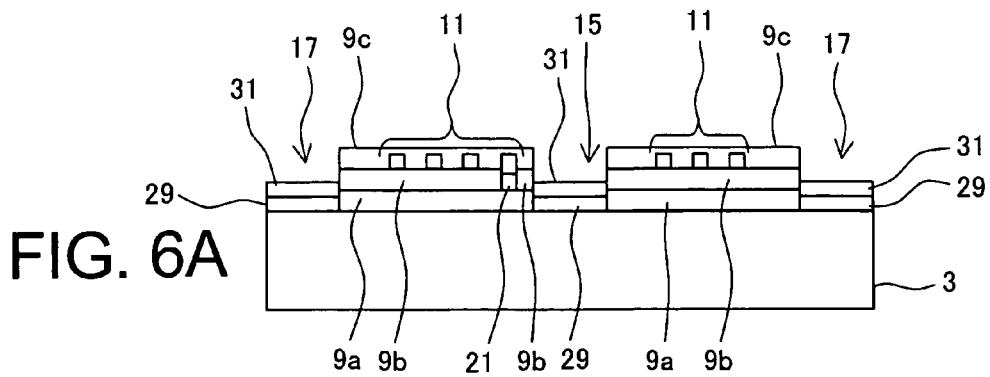
FIGS. 6A to 6D are sectional views showing the manufacturing process of the common mode choke coil 1 of the embodiment of the invention.
Figure 6B:
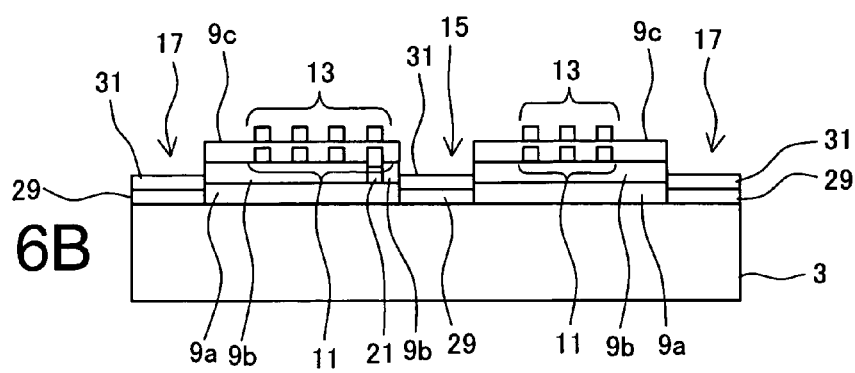

When the coil conductor 11 and the planarizing film 31 are formed using a the frame plating method, next, as shown in FIG. 6A, polyimide resin is applied on the entire surface to form an insulating film (third insulating film) 9c, and openings in which the planarizing film 31 is exposed at the upper parts of the open regions 15 and 17 are formed by patterning the insulating film 9c. Next, as shown in FIG. 6B, after a third metal layer (not shown) of a Cu layer or the like is formed, a coil conductor (second coil conductor) 13 patterned into a spiral shape and having a thickness of 5 µm is formed on the insulating film 9c by using a frame plating method. One terminal of the coil conductor 13 is formed in the vicinity of the open region 15, and the other terminal is formed at the periphery of the magnetic substrate 3 to be adjacent to the other terminal of the coil conductor 11 through the insulating film 9c. Since the coil conductor 13 is formed using a frame plating method similar to the method of manufacturing the coil conductor 11 and the planarizing film 31 described with reference to FIGS. 4A to 5C, the description will be omitted.

Figure 6C:
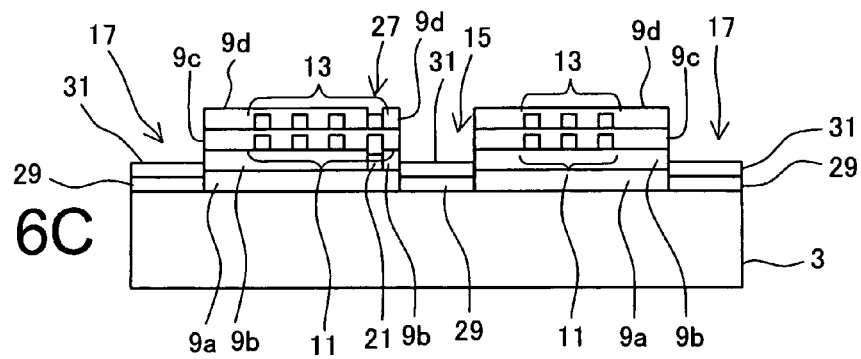

Next, as shown in FIG. 6C, polyimide resin is applied on the entire surface to form an insulating film (fourth insulating film) 9d having a thickness of 7 to 8 µm, and a contact hole 27 in which the one terminal of the coil conductor 13 is exposed and openings in which the planarizing film 31 at the open regions 15 and 17 are exposed are formed by patterning the insulating film 9d.

Figure 6D:
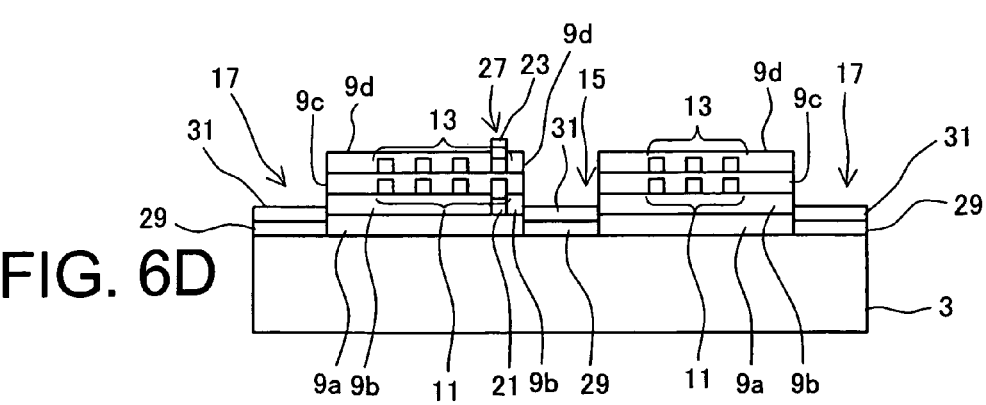

Next, as shown in FIG. 6D, a fourth metal layer (not shown) of a Cu layer or the like is formed on the entire surface and a lead terminal portion (second lead terminal portion) 23 having a thickness of 5 µm is formed by patterning the fourth metal layer. One terminal of the lead terminal portion 23 is formed on the one terminal of the coil conductor 13 exposed in the contact hole 27. As a result, the coil conductor 13 and the lead terminal portion 23 are electrically connected to each other. On the other hand, the other terminal faces the other terminal of the coil conductor 13 through the insulating film 9d and is formed at the periphery of the magnetic substrate 3 (see FIG. 2B).

Figure 7A:
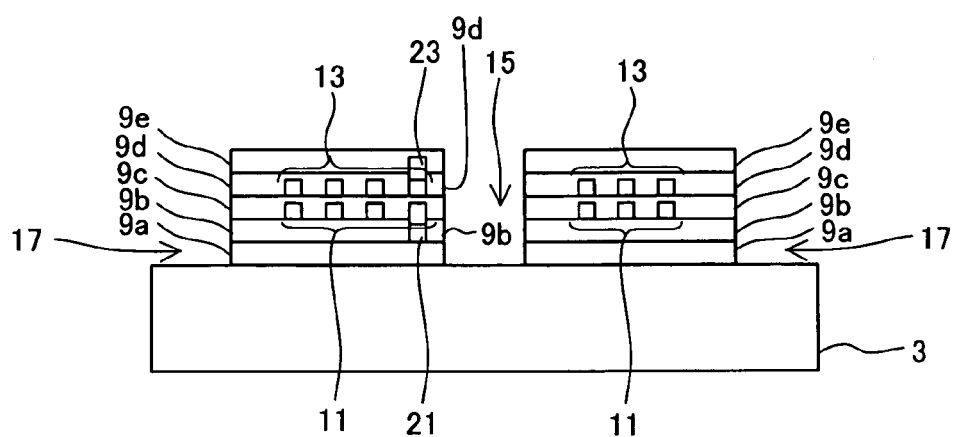
FIGS. 7A and 7B are sectional views showing the manufacturing process of the common mode choke coil 1 of the embodiment of the invention.

Next, as shown in FIG. 7A, polyimide resin is applied on the entire surface to form an insulating film (fifth insulating film) 9e having a thickness of 7 to 8 µm, and openings in which the open regions 15 and 17 are exposed are formed by patterning the insulating film 9e. Next, the planarizing films 29 and 31 are removed by wet etching.

Figure 7B:
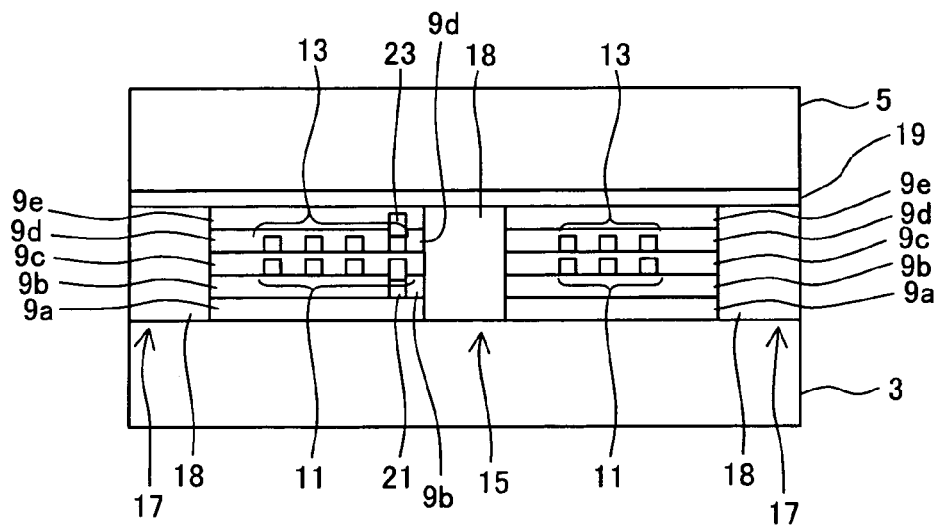
Figure 8A:
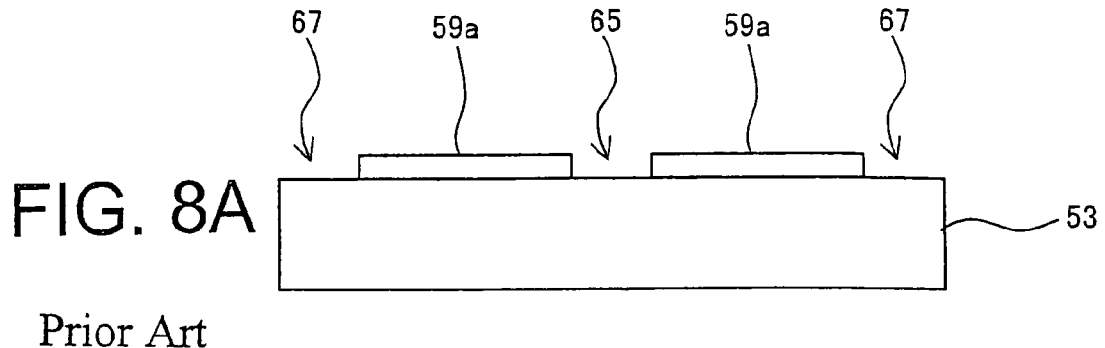
FIGS. 8A to 8D are sectional views showing a conventional manufacturing process of a common mode choke coil.
Figure 8B:
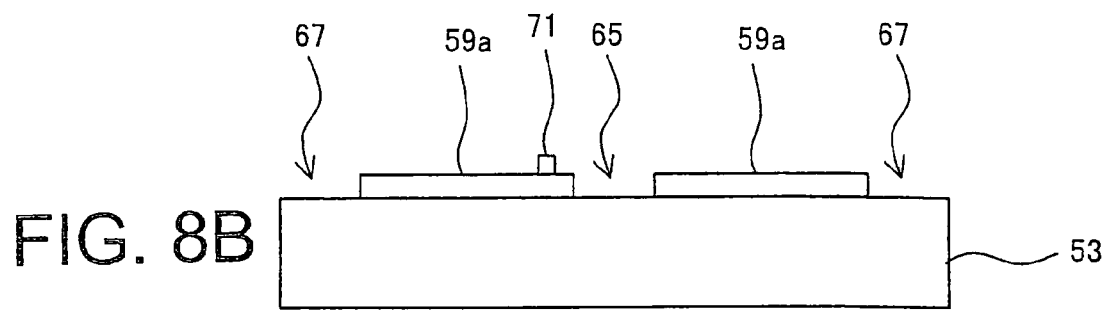
Figure 8C:
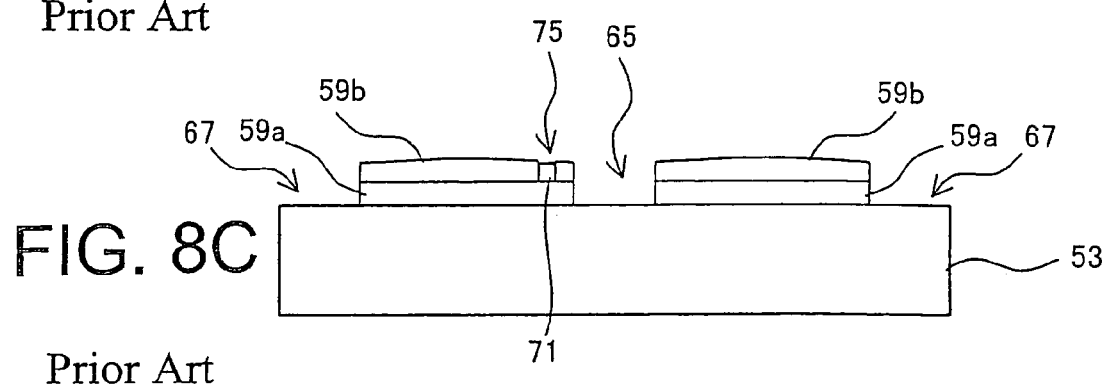
Figure 8D:
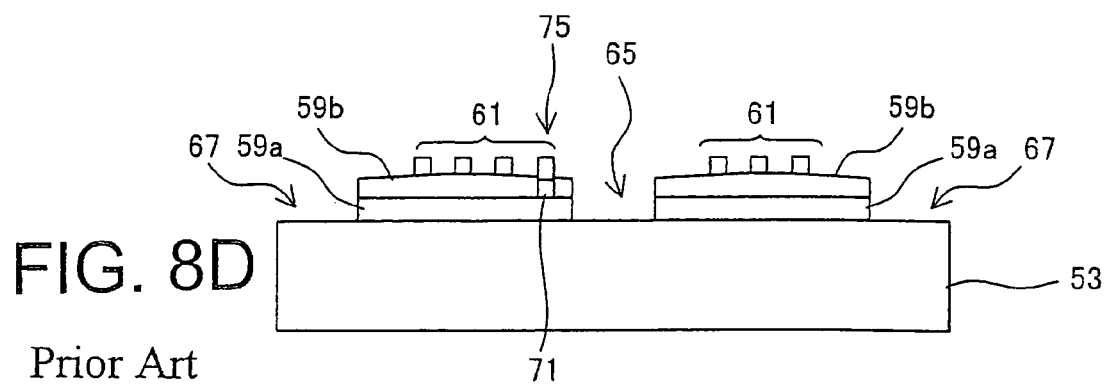
Figure 9A:
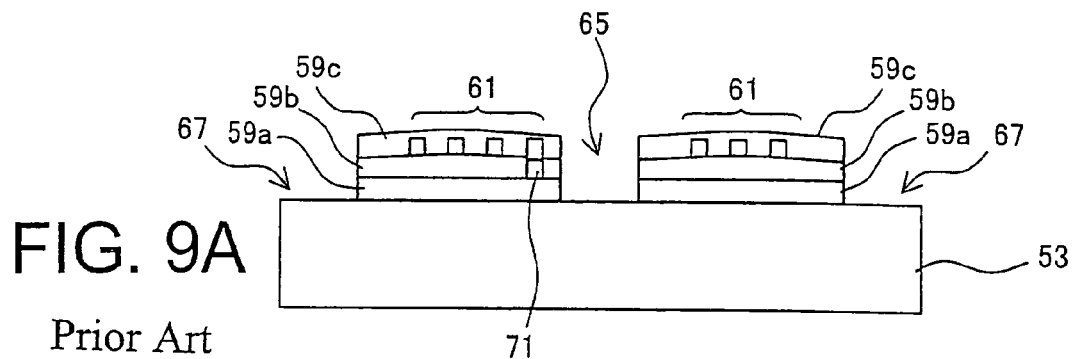
FIGS. 9A to 9D are sectional views showing the conventional manufacturing process of the common mode choke coil.
Figure 9B:
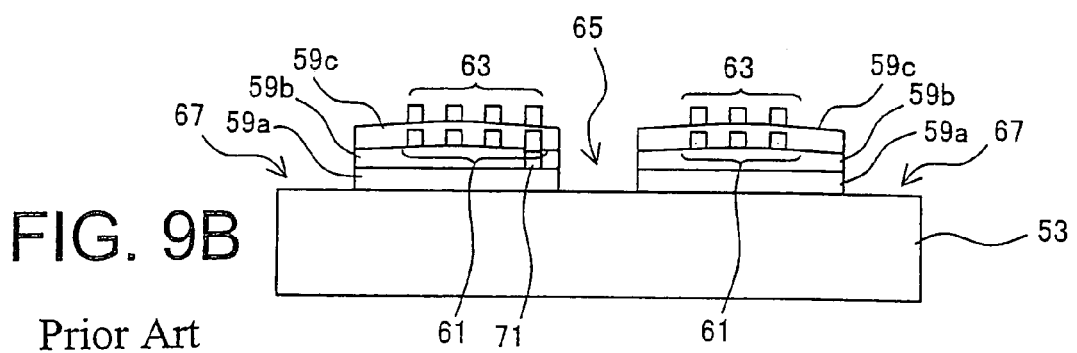
Figure 9C:
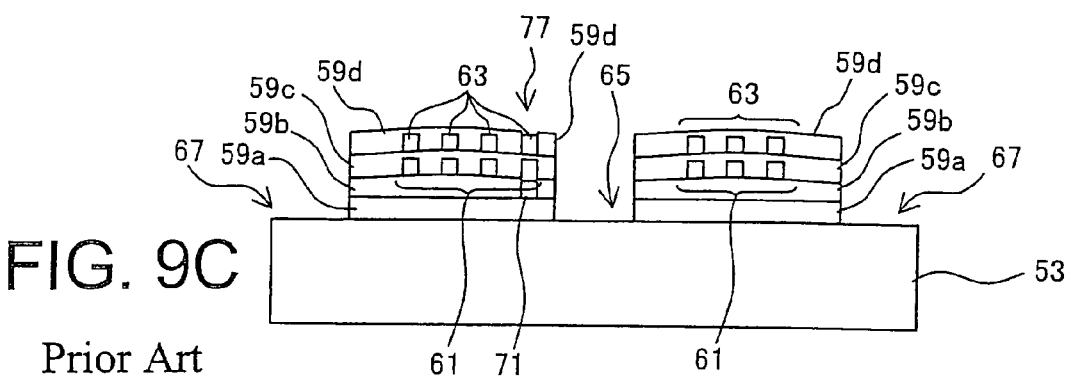
Figure 9D:
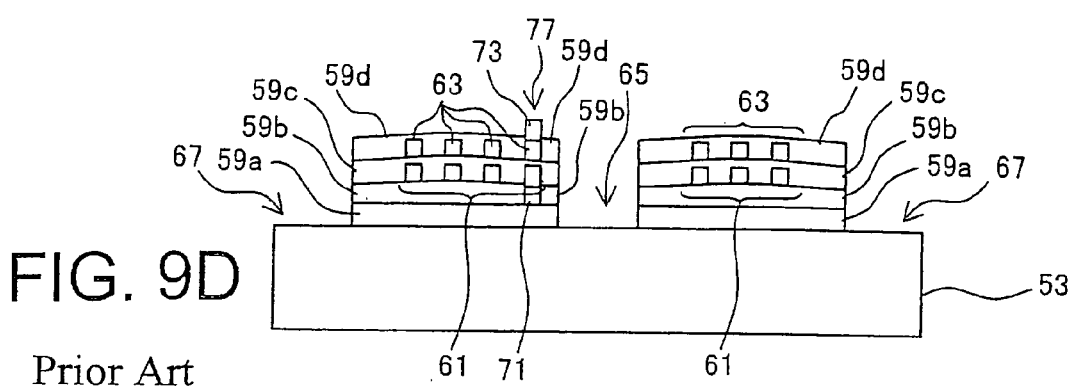
Figure 10A:
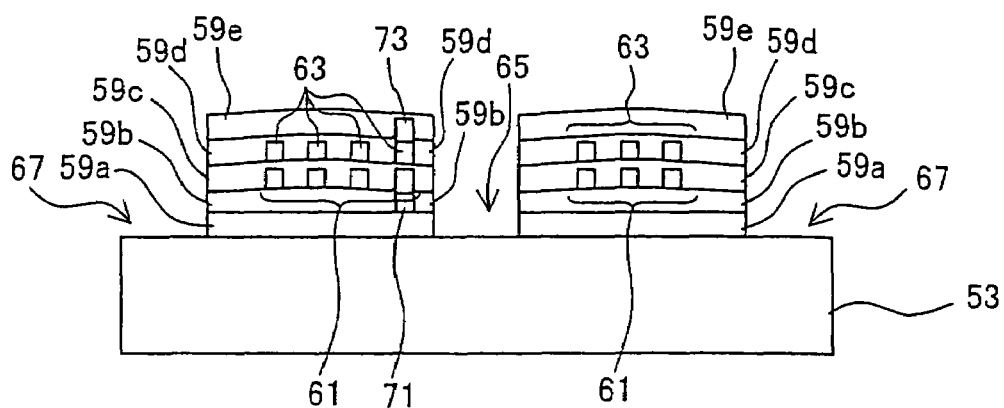
FIGS. 10A and 10B are sectional views showing the conventional manufacturing process of the common mode choke coil.
Figure 10B:
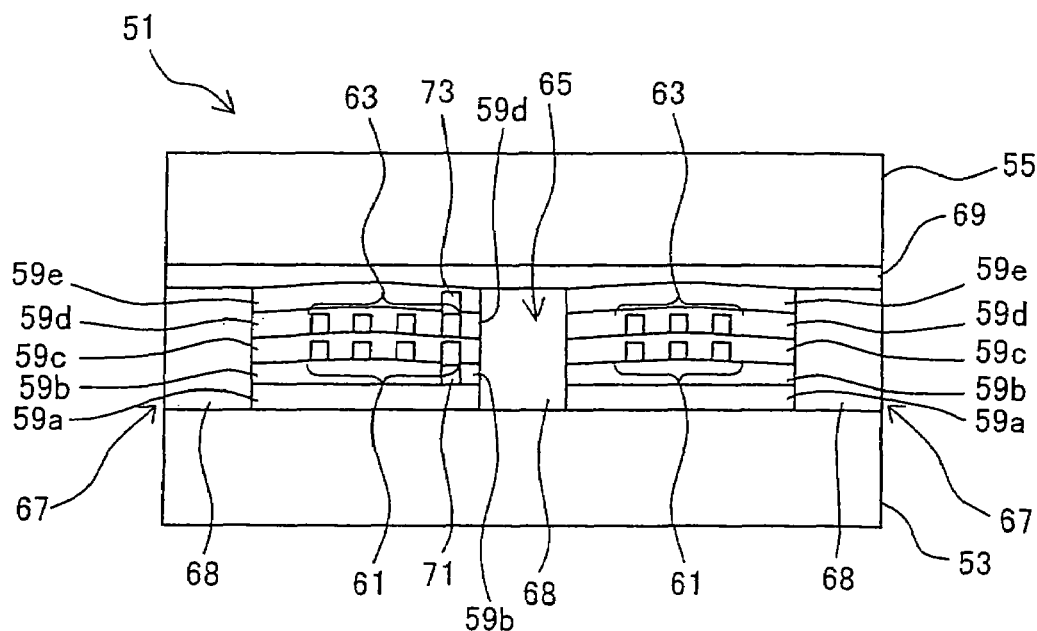

Next, as shown in FIG. 7B, composite ferrite obtained by mixing magnetic powder of ferrite in polyimide resin is embedded in the open regions 15 and 17 to form magnetic layers 18. Next, an adhesive is applied on the magnetic layers 18 in the open regions 15 and 17 and the insulating film 9e to form an adhesive layer 19. Next, a magnetic substrate (second magnetic substrate) 5 is attached to the adhesive layer 19.

Next, although not shown, an electrode film (not shown) of Ni (nickel) is formed using a sputtering method at formation positions of the other terminals of the lead terminal portions 21 and 23 disposed at the side surface of the common mode choke coil 1 and the other terminals of the coil conductors 11 and 13 to be virtually orthogonal to the substrate surface of the magnetic substrate 3 and to cross a portion between the magnetic substrates 3 and 5. Next, a film of alloy conductive material of Sn (tin), Ni and Cu (copper) is formed on the surface of the electrode film by barrel plating, an electrode terminal (not shown) having a two-layer structure made of Ni/Sn is formed, and the manufacture of the common mode choke coil 1 is completed.

As described above, in the method of manufacturing the common mode choke coil 1 of this embodiment, since the planarizing films 29 and 31 are formed to be laminated in the open regions 15 and 17, the step between the insulating film 9b at the formation surface of the coil conductor 11 and the open regions 15 and 17 can be decreased. As a result, variations in thickness of the insulating film 9c formed on the insulating film 9b and on the planarizing film 31 exposed in the open regions 15 and 17 are reduced, and the insulating film 9c is formed to have a vary uniform thickness. Besides, even if the thickness of the insulating layer 9c is made thin, a sufficiently flat film can be obtained. Since the insulating film 9b is uniform in thickness and the coil conductor 13 is formed on the sufficiently flat insulating film 9c, the resist layer having small thickness variation and patterning variation can be used. Thus, the interval between the coil conductors 11 and 13 can be made almost constant, the coil conductors 11 and 13 can be made close to and opposite to each other through the insulating film 9c, and the aspect ratio can be made large. Accordingly, it is possible to realize the common mode choke coil 1 in which the magnetic coupling between the coil conductors 11 and 13 is stabilized, the excellent degree of magnetic coupling is obtained, and the impedance characteristic is further improved.

When the coil conductor 13 is formed, the plating distribution of the plating film 41 formed in the resist frame 39 shown in FIGS. 4A to 5C is improved, the film thickness of the plating film 41 becomes almost uniform, and the sectional shape of the coil conductor 13 orthogonal to the direction of the flow of current becomes almost constant. Accordingly, the resistance value of the coil conductor 13 can be stabilized. Further, by the realization of film thickness equalization and film flattening of the insulating film 9c, and the equalization of the sectional shape of the coil conductor 13, the common mode choke coil 1 having the high impedance can be stably manufactured. Further, since the process of removing the planarizing films 29 and 31 has only to be added, the common mode choke coil 1 can be manufactured at low cost while the manufacturing process is hardly increased.

The invention is not limited to the embodiment described above and may be modified in various ways.

In the above embodiment, although the coil conductors 11 and 13 and the planarizing film 31 are formed by using the frame plating method, the invention is not limited to this. For example, instead of the frame plating method, sputtering, physical vapor deposition or the like may be naturally used to form the coil conductors 11 and 13 and the planarizing film 31.

In the above embodiment, although the planarizing films 29 and 31 are laminated in the open regions 15 and 17, the invention is not limited to this. For example, only one of the planarizing film 29 and the planarizing film 31 may be formed in the open regions 15 and 17. Also in this case, since the step between the insulating layer 9b at the formation surface of the coil conductor 11 and the open regions 15 and 17 is moderated to some degree, the variations in the thickness of the insulating film 9c can be suppressed. Besides, when only one layer is formed, a time of a removal process of the planarizing film can be shortened.

Besides, when the coil conductor 13 is formed, a planarizing film may be naturally further laminated on the planarizing films 29 and 31 of the open regions 15 and 17. In this case, since the film thickness of the insulating film 9d can be made uniform and the film can be made flat, an interlayer short between the coil conductor 13 and the lead terminal portion 23 can be certainly prevented.

Besides, in the above embodiment, although the description has been made while the common mode choke coil 1 is used as an example of the coil component, the invention is not limited to this. For example, the invention may be naturally used for manufacture of a common mode choke coil array in which plural common mode choke coils are formed in an array shape. In this case, each of the common mode choke coils has excellent degree of magnetic coupling and impedance characteristics, and characteristic variation between the plural common mode choke coils can be suppressed, so that the high performance common mode choke coil array can be manufactured.

What is claimed is:

1. A method of manufacturing a coil component, comprising the steps of:
    forming an insulating film on a magnetic substrate;
    forming a predetermined open region in the insulating film;
    forming a planarizing film in the open region;
    forming a coil conductor made of a conductive material on the insulating film;
    forming an insulating film on the coil conductor; and
    removing the planarizing film,
    wherein the planarizing film is formed by using the conductive material and at the same time as formation of the coil conductor.

2. A method of manufacturing a coil component, comprising the steps of:
    forming an insulating film on a magnetic substrate;
    forming a predetermined open region in the insulating film;
    forming a planarizing film in the open region;
    forming a coil conductor made of a conductive material on the insulating film;
    forming an insulating film on the coil conductor; and
    removing the planarizing film,
    wherein the planarizing film is formed before formation of the coil conductor, and wherein a planarizing film is further formed on the planarizing film by using the conuctive material and at the same time as formation of the coil conductor.

3. The method of manufacturing a coil component according to claim 1, wherein the coil conductor is formed using a frame plating method.

* * * * *